(12) United States Patent
Yamada

(10) Patent No.: US 11,143,863 B2
(45) Date of Patent: Oct. 12, 2021

(54) OPTICAL SCANNING DEVICE

(71) Applicant: Tsukasa Yamada, Tokyo (JP)

(72) Inventor: Tsukasa Yamada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 208 days.

(21) Appl. No.: 15/956,323

(22) Filed: Apr. 18, 2018

(65) Prior Publication Data
US 2018/0314059 A1 Nov. 1, 2018

(30) Foreign Application Priority Data

Apr. 28, 2017 (JP) .............................. JP2017-090689

(51) Int. Cl.
G02B 26/12 (2006.01)
G02B 26/10 (2006.01)
(Continued)

(52) U.S. Cl.
CPC ....... G02B 26/123 (2013.01); G02B 26/0858 (2013.01); G02B 26/101 (2013.01); G02B 26/127 (2013.01); G02B 27/0977 (2013.01)

(58) Field of Classification Search
CPC ...... G02B 26/12; G02B 26/123; G02B 26/10; G02B 26/101; G02B 26/105; G02B 26/127; G02B 26/0858; G02B 27/0977; B81B 3/0072; B81B 3/0018; B81B 3/0035; B81B 3/004; B81B 3/0045; B81B 3/0048; B81B 3/0062; B81B 3/0064; B81B 3/0067;

(Continued)

(56) References Cited

U.S. PATENT DOCUMENTS

2012/0162739 A1* 6/2012 Yamada ............... G02B 26/101
359/212.1
2013/0083379 A1 4/2013 Tanaka et al.
2018/0039074 A1 2/2018 Oyama et al.

FOREIGN PATENT DOCUMENTS

EP 2781948 9/2014
JP 2014-232176 12/2014
(Continued)

OTHER PUBLICATIONS

Extended European search report for European Patent Application No. 18168288.1 dated Aug. 31, 2018.
(Continued)

Primary Examiner — Marin Pichler
(74) Attorney, Agent, or Firm — IPUSA, PLLC

(57) ABSTRACT

An optical scanning device includes a drive beam configured to support a mirror, and a drive source provided on the drive beam and configured to oscillate the mirror about a predetermined axis passing through the center of the light reflecting surface of the mirror. The drive beam includes multiple beams each extending in a direction perpendicular to the predetermined axis and one or more turn-back parts each connecting ends of adjacent beams, and has a zigzag shape as a whole. The multiple beams include a first beam, a second beam adjacent to the first beam, and a third beam adjacent to the second beam, the one or more turn-back parts include a first turn-back part connecting the first and second beams and a second turn-back part connecting the second and third beams, and the first and second turn-back parts are different in weight.

13 Claims, 14 Drawing Sheets

(51) Int. Cl.
*G02B 27/09* (2006.01)
*G02B 26/08* (2006.01)

(58) Field of Classification Search
CPC ..... B81B 3/007; B81B 3/0078; B81B 3/0094; B81B 2201/032; B81B 2201/04; B81B 2201/042; B81B 2201/047; B81B 2203/0145
USPC ......... 359/197.1, 198.1, 199.1, 199.4, 205.1, 359/212.1, 213.1, 214.1, 220.1, 221.2, 359/223.1, 224.1
See application file for complete search history.

(56) References Cited

FOREIGN PATENT DOCUMENTS

| | | |
|---|---|---|
| JP | 2014-235298 | 12/2014 |
| JP | 2015-175984 | 10/2015 |
| JP | 2016-118726 | 6/2016 |
| JP | 2016-206235 | 12/2016 |

OTHER PUBLICATIONS

Office Action dated Feb. 24, 2021 (Japanese Patent Application No. 2017-090689).

* cited by examiner f1 f3 f0 f2

OPTICAL SCANNING DEVICE

CROSS-REFERENCE TO RELATED APPLICATION

This application is based upon and claims priority to Japanese Patent Application No. 2017-090689, filed on Apr. 28, 2017, the entire contents of which are incorporated herein by reference.

BACKGROUND OF THE INVENTION

1. Field of the Invention

The present invention relates to optical scanning devices.

2. Description of the Related Art

Optical scanning devices that perform scanning with light by rotating a mirror about an axis of rotation have been known. According to such optical scanning devices, which use a sawtooth voltage as a drive source, ringing due to resonant oscillations of the mirror may occur during driving. The occurrence of ringing leads to the degradation of the quality of an image formed by the scanning performed by the optical scanning devices.

Therefore, various techniques for controlling the ringing of the mirror have been discussed. Examples of such techniques include an optical scanning device that includes a sensor and a controller, where the sensor outputs a sensor signal having amplitude commensurate with the rotation angle of the mirror to the controller and the controller generates a drive signal to be output to a piezoelectric actuator to rotate the mirror about an axis of rotation.

According to this optical scanning device, the controller generates the frequency-domain signal of a correction drive signal, using the amplitude and phase of a reference frequency-domain signal generated by performing Fourier transform on a reference sensor signal, with respect to a frequency-domain signal generated by performing Fourier transform on a sensor signal. The controller performs inverse Fourier transform on the generated frequency-domain signal to generate the correction drive signal as a drive signal. (See, for example, Japanese Laid-open Patent Publication No. 2016-118726.)

SUMMARY OF THE INVENTION

According to an aspect of the present invention, an optical scanning device includes a mirror including a light reflecting surface, a drive beam configured to support the mirror, and a drive source provided on the drive beam. The drive source is configured to oscillate the mirror about a predetermined axis passing through the center of the light reflecting surface. The drive beam includes multiple beams each extending in a direction perpendicular to the predetermined axis and one or more turn-back parts each connecting ends of adjacent beams among the multiple beams. The drive beam has a zigzag shape as a whole. The multiple beams include a first beam, a second beam adjacent to the first beam, and a third beam adjacent to the second beam, the one or more turn-back parts include a first turn-back part connecting the first and second beams and a second turn-back part connecting the second and third beams, and the weight of the first turn-back part is different from the weight of the second turn-back part.

DETAILED DESCRIPTION OF THE PREFERRED EMBODIMENTS

Figure 1:
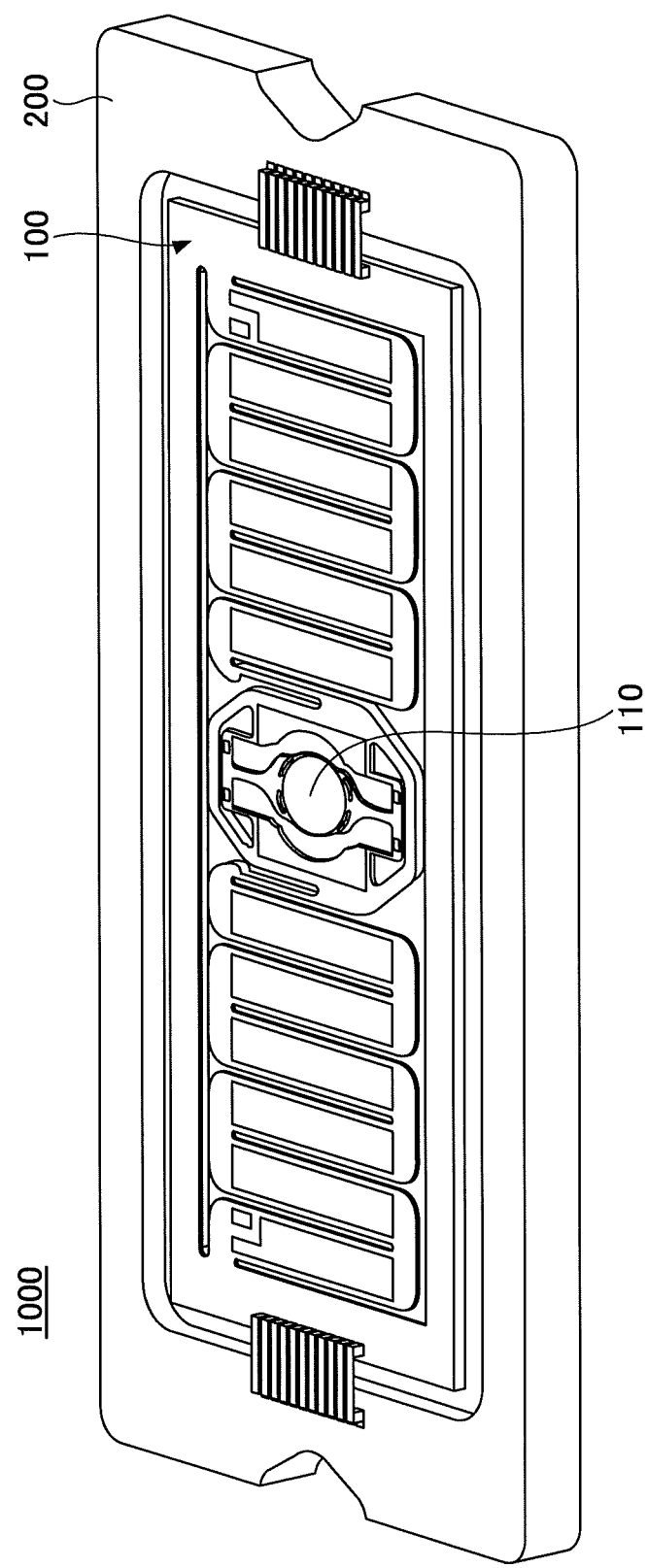
FIG. 1 is a perspective view of an optical scanning device according to a first embodiment.

According to the above-described optical scanning device, however, not only complicated signal processing is required, but also controlling ringing by signal processing rounds the linear displacement region of a sawtooth wave to degrade scan line quality. Therefore, there is a demand for controlling the occurrence of ringing by a mechanical method such as changing the shape of an optical scanning device.

An optical scanning device according to an aspect of the present invention can control the occurrence of ringing by a method that is different than conventionally.

Embodiments of the present invention are described below with reference to the drawings. In the drawings, the same components are given the same reference numeral, and a repetitive description thereof may be omitted.

First Embodiment

Figure 2:
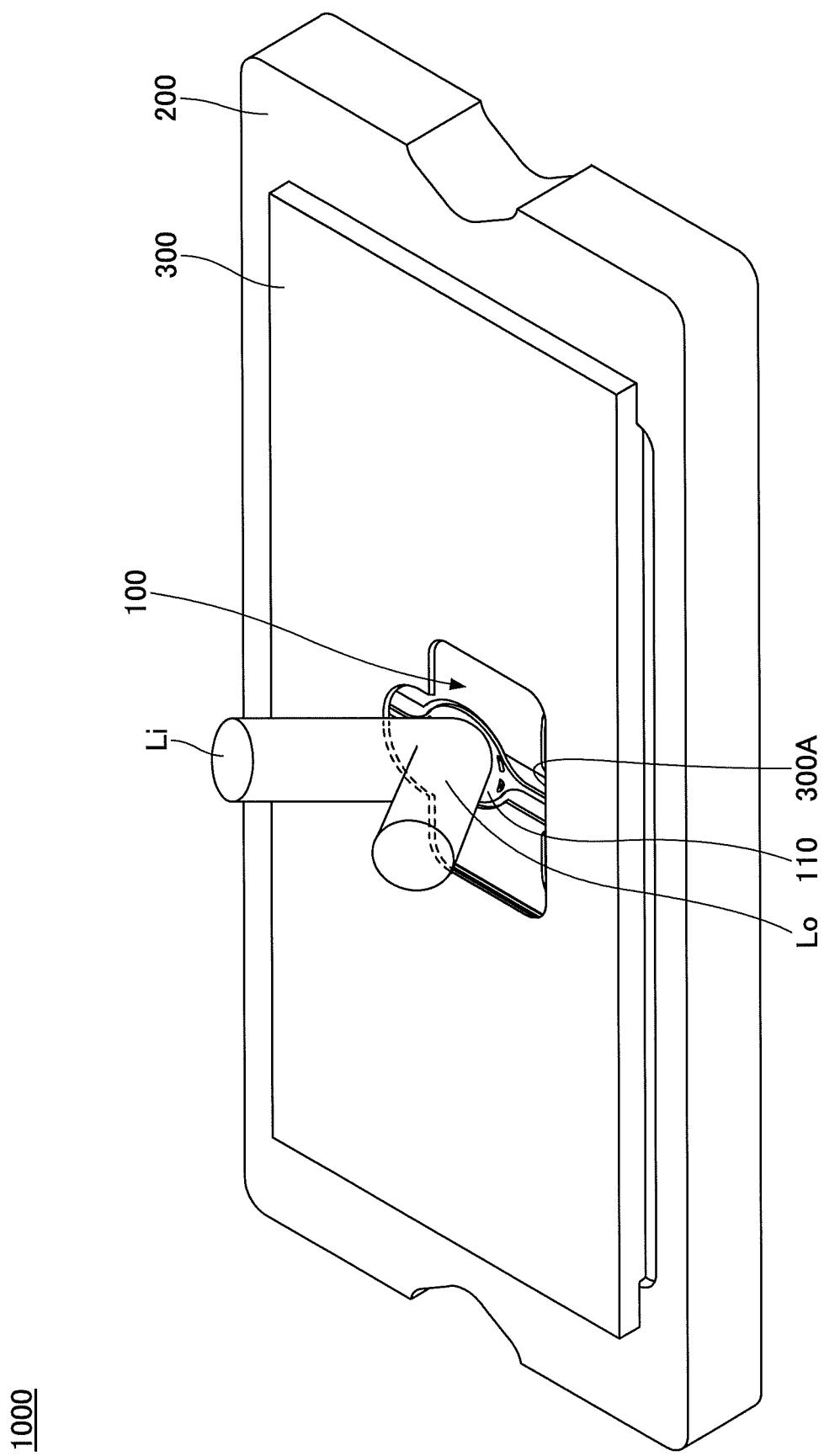
FIG. 2 is a perspective view of the optical scanning device according to the first embodiment.

First, an optical scanning device according to a first embodiment is described. FIGS. 1 and 2 are perspective views of an optical scanning device according to the first embodiment. FIG. 1 illustrates the optical scanning device from which a package cover is removed. FIG. 2 illustrates the optical scanning device with the package cover attached.

As illustrated in FIGS. 1 and 2, an optical scanning device 1000 includes an optical scanning part 100, a ceramic package 200 on which the optical scanning part 100 is mounted, and a package cover 300 placed on the ceramic package 200 to cover the optical scanning part 100. The optical scanning device 1000 may include a board, a control circuit, etc., under the ceramic package 200.

According to the optical scanning device 1000, an opening 300A is provided in the substantial center of the package cover 300 to expose a mirror 110 including a light reflecting surface and its vicinity. The opening 300A is so shaped as to block neither incident laser light Li on the mirror 110 nor outgoing laser light Lo (scanning light) from the mirror 110.

The opening 300A is smaller on the side where the incident laser light Li passes than on the side where the outgoing laser light Lo passes. That is, the opening 300A is substantially semi-circular and narrow on the incident laser light Li side, while being rectangular and wide on the outgoing laser light Lo side. This is because, for the incident laser light Li, which is made incident from a fixed direction, the opening 300A may be open only in that direction, while the opening 300A has to be open for the entirety of a region scanned by the outgoing laser light Lo, which is caused to perform scanning two-dimensionally, so as not to block the outgoing laser light Lo.

Figure 3:
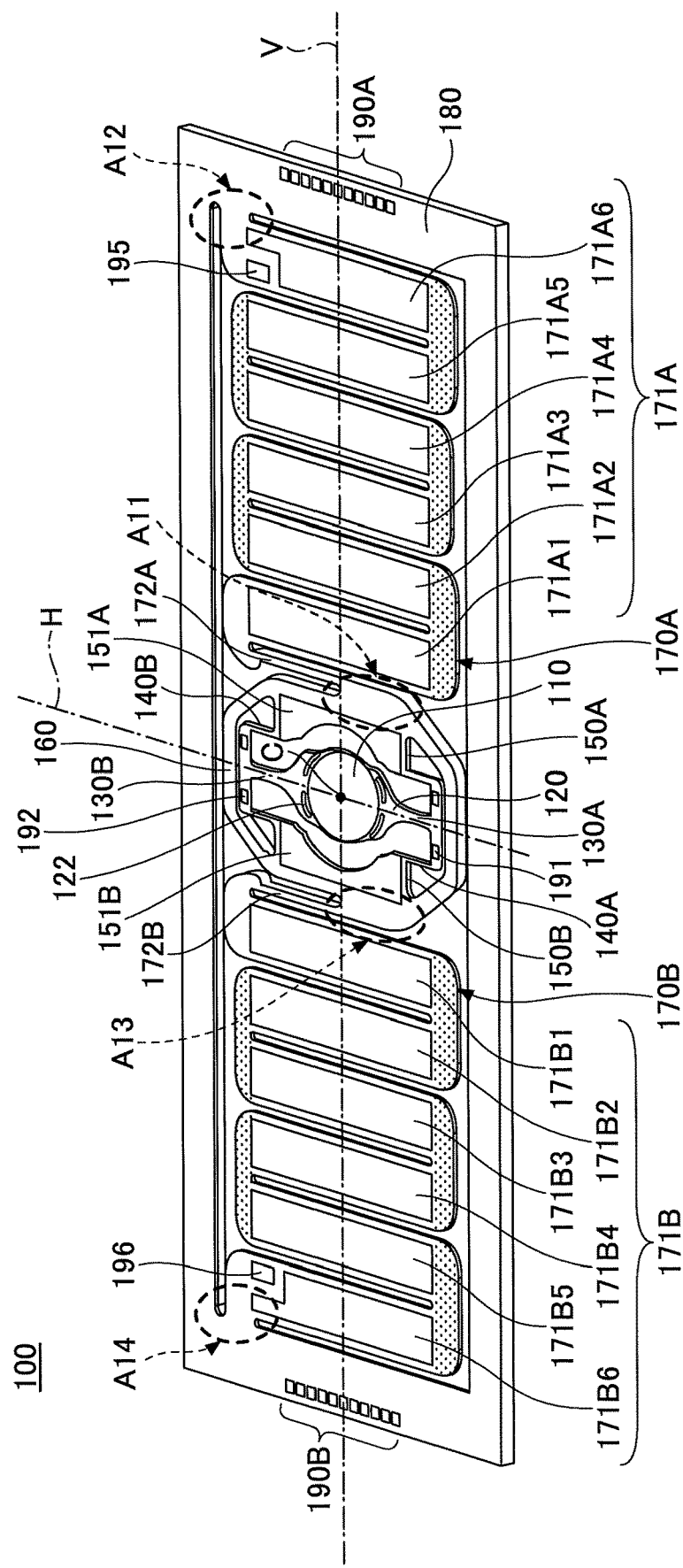
FIG. 3 is an upper-side perspective view of an optical scanning part of the optical scanning device according to the first embodiment.

Next, the optical scanning part 100 of the optical scanning device 1000 is described. FIG. 3 is an upper-side perspective view of an optical scanning part of an optical scanning device according to the first embodiment.

As illustrated in FIG. 3, the optical scanning part 100 oscillates the mirror 110 to cause incident laser light emitted from a light source to perform scanning. The optical scanning part 100 is, for example, a microelectromechanical systems (MEMS) mirror that drives the mirror 110 with a piezoelectric element.

The optical scanning part 100 includes the mirror 110 including a light reflecting surface, a movable frame 160 that externally supports the mirror 110, and a pair of second drive beams 170A and 170B that support the movable frame 160 from both sides.

A movable frame connection part A11 is where the movable frame 160 and the second drive beam 170A are connected. A fixed frame connection part A12 is where a fixed frame 180 and the second drive beam 170A are connected. The movable frame connection part A11 is placed on the side substantially opposite to the side on which the fixed frame connection part A12 is placed relative to an axis passing through a center C of the light reflecting surface of the mirror 110 (hereinafter also referred to as "a vertical rotation axis V").

A movable frame connection part A13 is where the movable frame 160 and the second drive beam 170B are connected. A fixed frame connection part A14 is where the fixed frame 180 and the second drive beam 170B are connected. The movable frame connection part A13 is placed on the side substantially opposite to the side on which the fixed frame connection part A14 is placed relative to the vertical rotation axis V.

The movable frame connection parts A11 and A13 may be placed on the side opposite to the side on which the fixed frame connection parts A12 and A14 are placed, respectively, relative to the vertical rotation axis V, so that respective ends of the movable frame connection parts A11 and A13 include the vertical rotation axis V. The second drive beams 170A and 170B are axisymmetrically placed with respect to a straight line passing through the center C of the light reflecting surface of the mirror 110 and perpendicular to the vertical rotation axis V (hereinafter referred to as "horizontal rotation axis H") serving as an axis of symmetry. A detailed description is given below.

The optical scanning part 100 includes the mirror 110, a mirror supporting part 120, torsion beams 130A and 130B, connecting beams 140A and 140B, first drive beams 150A and 150B, the movable frame 160, the second drive beams 170A and 170B, and the fixed frame 180. The first drive beams 150A and 150B include respective drive sources 151A and 151B. The second drive beams 170A and 170B include respective drive sources 171A and 171B. The first drive beams 150A and 150B and the second drive beams 170A and 170B operate as actuators to oscillate the mirror 110 vertically or horizontally to cause laser light to perform scanning.

In the mirror supporting part 120, slits 122 are formed along the circumference of the mirror 110. The slits 122 make it possible to transmit torsion due to the torsion beams 130A and 130B to the mirror 110 while reducing the weight of the mirror supporting part 120.

In the optical scanning part 100, the mirror 110 is supported on the upper surface of the mirror supporting part 120, and the mirror supporting part 120 is connected to the ends of the torsion beams 130A and 130B provided one on each side of the mirror supporting part 120. The torsion beams 130A and 130B form an axis of oscillation and axially extend to support the mirror supporting part 120 from both sides in the axial direction. The torsion beams 130A and 130B twist to oscillate the mirror 110 supported on the mirror supporting part 120, so that the mirror 110 operates to cause the reflected light of light emitted onto the mirror 110 to perform scanning. The torsion beams 130A and 130B are connected to and supported by the connecting beams 140A and 140B to be connected to the first drive beams 150A and 150B, respectively.

The first drive beams 150A and 150B, the connecting beams 140A and 140B, the torsion beams 130A and 130B, the mirror supporting part 120, and the mirror 110 are externally supported by the movable frame 160. The first drive beams 150A and 150B are supported by the movable frame 160 on one side and extend along the circumference of the mirror 110 to be connected to the connecting beams 140A and 140B, respectively, on the other side.

The first drive beams 150A and 150B are provided as a pair to have the mirror 110 and the mirror supporting part 120 interposed between the first drive beams 150A and 150B in a direction perpendicular to the torsion beams 130A and 130B. The drive sources 151A and 151B are formed on the upper surfaces of the first drive beams 150A and 150B, respectively. Each of the drive sources 151A and 151B includes a thin film of a piezoelectric element (hereinafter also referred to as "piezoelectric thin film"), an upper electrode formed on the upper surface of the piezoelectric thin film, and a lower electrode formed on the lower surface of the piezoelectric thin film. The drive sources 151A and 151B expand or compress in accordance with the polarity of a drive voltage applied to the upper electrode and the lower electrode.

Therefore, when drive voltages of different phases are alternately applied to the first drive beam 150A and the first drive beam 150B, the first drive beam 150A and the first drive beam 150B alternately oscillate vertically in opposite directions on the left side and the right side of the mirror 110. As a result, the mirror 110 can oscillate about an axis with the torsion beams 130A and 130B serving as an axis of oscillation or an axis of rotation. Hereinafter, directions in which the mirror 110 oscillates about the axis of the torsion beams 130A and 130B are referred to as "horizontal direction." For example, for horizontal driving by the first drive beams 150A and 150B, resonant oscillations are employed to make it possible to oscillate the mirror 110 at high speed.

The second drive beams 170A and 170B have their respective one ends connected to the outside of the movable frame 160 through connecting beams 172A and 172B in the movable frame connection parts A11 and A13, respectively. The second drive beams 170A and 170B are provided as a pair to hold the movable frame 160 from the left side and the right side. The second drive beams 170A and 170E support the movable frame 160 from both sides and oscillate the movable frame 160 about the vertical rotation axis V. The second drive beams 170A and 170B have their respective other ends connected to the inside of the fixed frame 180 in the fixed frame connection parts A12 and A14, respectively.

Thus, in the optical scanning part 100, the movable frame connection part A11 where the movable frame 160 and the second drive beam 170A are connected is placed on the side substantially opposite to the side on which the fixed frame connection part A12 where the fixed frame 180 and the second drive beam 170A are connected is placed relative to the vertical rotation axis V.

Furthermore, in the optical scanning part 100, the movable frame connection part A13 where the movable frame 160 and the second drive beam 170B are connected is placed on the side substantially opposite to the side on which the fixed frame connection part A14 where the fixed frame 180 and the second drive beam 170B are connected is placed relative to the vertical rotation axis V.

In addition, the movable frame connection parts A11 and A13 may be placed on the side opposite to the side on which the fixed frame connection parts A12 and A14 are placed, respectively, relative to the vertical rotation axis V, so that respective ends of the movable frame connection parts A11 and A13 include the vertical rotation axis V. Furthermore, the second drive beams 170A and 170B are axisymmetrically placed with respect to the horizontal rotation axis H serving as an axis of symmetry.

Figure 4:
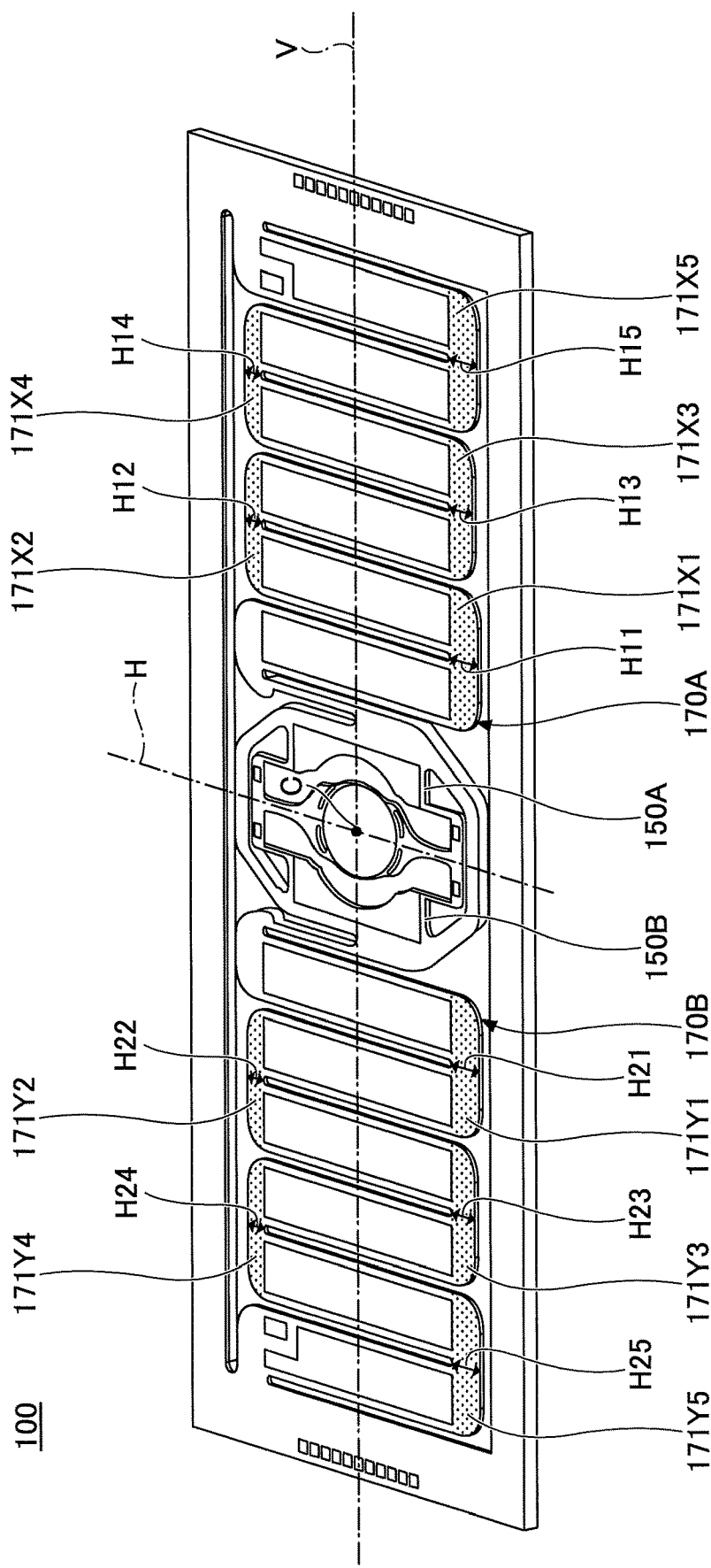
FIG. 4 is a diagram illustrating the height of a turn-back part.

As illustrated in FIGS. 3 and 4, the second drive beam 170A includes multiple rectangular vertical beams extending in a direction perpendicular to the vertical rotation axis V (a direction parallel to the first drive beam 150A) and turn-back parts each connecting ends of adjacent vertical beams, and as a whole, has a zigzag shape.

For example, the first vertical beam and the second vertical beam from the first drive beam 150A have respective ends connected by a turn-back part 171X1. The second vertical beam and the third vertical beam have respective ends connected by a turn-back part 171X2. The third vertical beam and the fourth vertical beam have respective ends connected by a turn-back part 171X3. The fourth vertical beam and the fifth vertical beam have respective ends connected by a turn-back part 171X4. The fifth vertical beam and the sixth vertical beam have respective ends connected by a turn-back part 171X5. In FIGS. 3 and 4, the turn-back parts are indicated by a dotted pattern for clarity.

Likewise, the second drive beam 170B includes multiple rectangular vertical beams extending in a direction perpendicular to the vertical rotation axis V (a direction parallel to the first drive beam 150B) and turn-back parts each connecting ends of adjacent vertical beams, and as a whole, has a zigzag shape.

For example, the first vertical beam and the second vertical beam from the first drive beam 150B have respective ends connected by a turn-back part 171Y1. The second vertical beam and the third vertical beam have respective ends connected by a turn-back part 171Y2. The third vertical beam and the fourth vertical beam have respective ends connected by a turn-back part 171Y3. The fourth vertical beam and the fifth vertical beam have respective ends connected by a turn-back part 171Y4. The fifth vertical beam and the sixth vertical beam have respective ends connected by a turn-back part 171Y5.

The turn-back parts 171X1, 171X2, 171X3, 171X4 and 171X5 have heights H11, H12, H13, H14 and H15, respectively. The turn-back parts 171Y1, 171Y2, 171Y3, 171Y4 and 171Y5 have heights H21, H22, H23, H24 and H25, respectively. The height of the turn-back part is a maximum length in a direction parallel to the horizontal rotation axis H (a direction perpendicular to the vertical rotation axis V).

The drive sources 171A and 171B are formed on the upper surfaces of the second drive beams 170A and 170B, respectively, one on each vertical beam that is a rectangular unit without a curving portion. Each of the drive sources 171A includes a piezoelectric thin film, an upper electrode formed on the upper surface of the piezoelectric thin film, and a lower electrode formed on the lower surface of the piezoelectric thin film. Each of the drive sources 171B includes a piezoelectric thin film, an upper electrode formed on the upper surface of the piezoelectric thin film, and a lower electrode formed on the lower surface of the piezoelectric thin film.

By having drive voltages of different polarities applied to adjacent drive sources 171A and 171B, the second drive beams 170A and 170B cause adjacent vertical beams to warp vertically in opposite directions, and transmit the accumulated vertical movements of the vertical beams to the movable frame 160. By this action, the second drive beams 170A and 170B oscillate the mirror 110 in vertical directions perpendicular to the parallel direction (hereinafter collectively referred to "vertical direction"). For example, non-resonant oscillations may be used for vertical driving by the second drive beams 170A and 170B.

For example, it is assumed that the drive sources 171A include drive sources 171A1, 171A2, 171A3, 171A4, 171A5 and 171A6 that are arranged rightward from the movable frame 160. Furthermore, it is assumed that the drive sources 171B include drive sources 171B1, 171B2, 171B3, 171B4, 171B5 and 171B6 that are arranged leftward from the movable frame 160. In this case, vertical oscillations can be performed by driving the drive sources 171A1, 171B1, 171A3, 171B3, 171A5 and 171B5 with the same first waveform and driving the drive sources 171A2, 171B2, 171A4, 171B4, 171A6 and 171B6 with the same second waveform different in phase from the first waveform.

Drive wiring lines for applying a drive voltage to the upper electrode and the lower electrode of the drive source 151A are connected to predetermined terminals included in a terminal group 190A provided on the fixed frame 180. Drive wiring lines for applying a drive voltage to the upper electrode and the lower electrode of the drive source 151B are connected to predetermined terminals included in a terminal group 190B provided on the fixed frame 180. Drive wiring lines for applying a drive voltage to the upper electrodes and the lower electrodes of the drive sources 171A are connected to predetermined terminals included in the terminal group 190A provided on the fixed frame 180. Drive wiring lines for applying a drive voltage to the upper electrodes and the lower electrodes of the drive sources 171B are connected to predetermined terminals included in the terminal group 190B provided on the fixed frame 180.

The optical scanning part 100 includes piezoelectric sensors 191 and 192. The piezoelectric sensors 191 and 192 serve as horizontal deflection angle sensors to detect the degree of tilt in the horizontal direction (the deflection angle in the horizontal direction) of the mirror 110 oscillating in the horizontal direction with drive voltages being applied to the drive sources 151A and 151B. The piezoelectric sensors 191 are provided on the connecting beam 140A, and the piezoelectric sensors 192 are provided on the connecting beam 140B.

The optical scanning part 100 includes piezoelectric sensors 195 and 196. The piezoelectric sensors 195 and 196 serve as vertical deflection angle sensors to detect the degree of tilt in the vertical direction (the deflection angle in the vertical direction) of the mirror 110 oscillating in the vertical direction with drive voltages being applied to the drive sources 171A and 171B. The piezoelectric sensor 195 is provided on one of the vertical beams of the second drive beam 170A, and the piezoelectric sensor 196 is provided on one of the vertical beams of the second drive beam 170B.

The piezoelectric sensors 191 output a current value corresponding to the displacement of the connecting beam 140A transmitted from the torsion beam 130A as the mirror 110 tilts in the horizontal direction. The piezoelectric sensors 192 output a current value corresponding to the displacement of the connecting beam 140B transmitted from the torsion beam 130B as the mirror 110 tilts in the horizontal direction. The piezoelectric sensor 195 outputs a current value corresponding to the displacement of a vertical beam on which the piezoelectric sensor 195 is provided among the second drive beams 170A as the mirror 110 tilts in the vertical direction. The piezoelectric sensor 196 outputs a current value corresponding to the displacement of a vertical beam on which the piezoelectric sensor 196 is provided among the second drive beams 170B as the mirror 110 tilts in the vertical direction.

According to the first embodiment, the outputs of the piezoelectric sensors 191 and 192 are used to detect the degree of tilt of the mirror 110 in the horizontal direction, and the outputs of the piezoelectric sensors 195 and 196 are used to detect the degree of tilt of the mirror 110 in the vertical direction. A tilt detecting part to detect the degree of tilt of the mirror 110 from the output current values of the piezoelectric sensors may be provided outside the optical scanning part 100. Furthermore, a drive control part to control drive voltages supplied to the drive sources 151A and 151B and the drive sources 171A and 171B based on the detection result of the tilt detecting part may be provided outside the optical scanning part 100.

Each of the piezoelectric sensors 191, 192, 195 and 196 includes a piezoelectric thin film, an upper electrode formed on the upper surface of the piezoelectric thin film, and a lower electrode formed on the lower surface of the piezoelectric thin film. According to the first embodiment, the output of each piezoelectric sensor is the current value of sensor wiring lines connected to the upper electrode and the lower electrode.

The sensor wiring lines extended from the upper electrodes and the lower electrodes of the piezoelectric sensors 191 are connected to predetermined terminals included in the terminal group 190B provided on the fixed frame 180. The sensor wiring lines extended from the upper electrode and the lower electrode of the piezoelectric sensor 195 are connected to predetermined terminals included in the terminal group 190A provided on the fixed frame 180. The sensor wiring lines extended from the upper electrodes and the lower electrodes of the piezoelectric sensors 192 are connected to predetermined terminals included in the terminal group 190B provided on the fixed frame 180. The sensor wiring lines extended from the upper electrode and the lower electrode of the piezoelectric sensor 196 are connected to predetermined terminals included in the terminal group 190B provided on the fixed frame 180.

Figure 5:
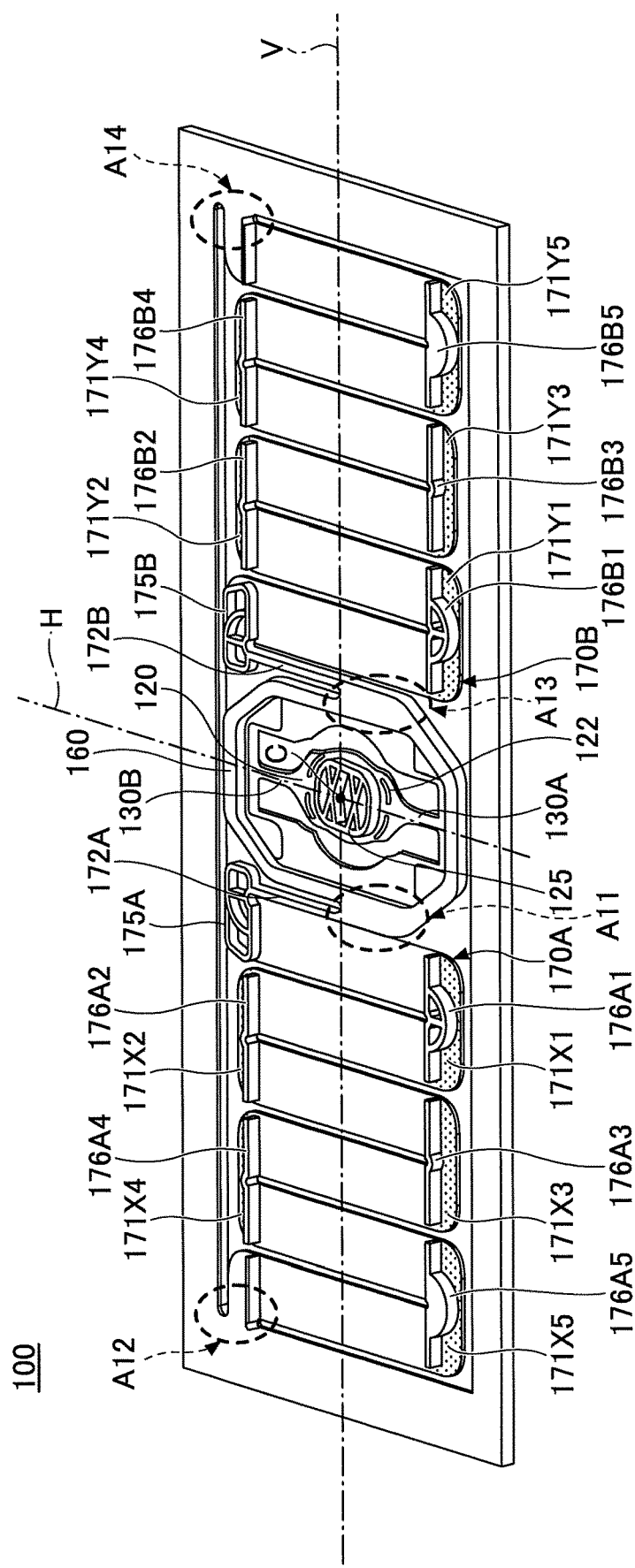
FIG. 5 is a lower-side perspective view of the optical scanning part of the optical scanning device according to the first embodiment.

FIG. 5 is a lower-side perspective view of the optical scanning part of the optical scanning device according to the first embodiment.

As illustrated in FIG. 5, a rib 125 is provided on the lower surface of the mirror supporting part 120. Providing the rib 125 makes it possible to prevent the generation of distortion in the mirror 110 and keep the mirror 110 flat during the driving of the mirror 110. The rib 125 has a contour substantially identical to the shape of the mirror 110. This makes it possible to make the entirety of the mirror flat. The slits 122 formed in the mirror supporting part 120 make it possible to distribute stress transmitted from the torsion beams 130A and 130B within the mirror supporting part 120 to prevent the stress from being transmitted to the rib 125.

Ribs 175A and 175B are provided where the second drive beams 170A and 170B connect to the connecting beams 172A and 172B on the lower surfaces of the second drive beams 170A and 170B, respectively. Providing the ribs 175A and 175B makes it possible to reinforce, and thereby increase the stiffness and prevent the deformation of, the connections of the second drive beams 170A and 170B and the connecting beams 172A and 172B.

In the second drive beam 170A, ribs 176A1, 176A2, 176A3, 176A4 and 176A5 are provided on the lower surfaces of the turn-back parts 171X1, 171X2, 171X3, 171X4 and 171X5, respectively. Likewise, in the second drive beam 170B, ribs 176B1, 176B2, 176B3, 176B4 and 176B5 are provided on the lower surfaces of the turn-back parts 171Y1, 171Y2, 171Y3, 171Y4 and 171Y5, respectively. Providing the ribs 176A1 through 176A5 and 176B1 through 176B5 makes it possible to reinforce, and thereby increase the stiffness and prevent the deformation of, the turn-back parts 171X1 through 171X5 and 171Y1 through 171Y5 each connecting adjacent vertical beams.

The optical scanning part 100 is so designed that with respect to three adjacent vertical beams (a first beam, a second beam, and a third beam) placed on each side of the movable frame 160, a turn-back part connecting the first beam and the second beam is different in weight from a turn-back part connecting the second beam and the third beam. Turn-back parts each connecting adjacent vertical beams may be different in weight with respect to four or more adjacent vertical beams.

According to embodiments of the present invention, "the weight of a turn-back part" means "the weight of a turn-back part itself plus the weight of a rib provided on the turn-back part." Therefore, a first method of changing the weight of a turn-back part is to change the weight of a turn-back part itself by changing the height of the turn-back part. A second method of changing the weight of a turn-back part is to change the weight of a rib provided on a turn-back part. Only one of the first method and the second method may be adopted or both of the first method and the second method may be used.

Thus, by causing turn-back parts each connecting adjacent vertical beams to be different in weight with respect to at least three adjacent vertical beams, it is possible to distribute vibration energy at the time of driving the second drive beams 170A and 170B. Therefore, it is possible to reduce gain in a particular normal mode of vibration. A detailed description is given below with reference to FIGS. 8 through 12D.

In FIG. 4, by way of example, it is assumed that H11=H15>H13>H12=H14 and H21=H25>H23>H22=H24. In FIG. 5, by way of example, the ribs 176A2, 176A3 and 176A4 are equal in weight, while the weight of each of the ribs 176A2 through 176A4<the weight of the rib 176A1<the weight of the rib 176A5. Furthermore, the ribs 176B2, 176B3 and 176B4 are equal in weight, while the weight of each of the ribs 176B2 through 176B4<the weight of the rib 176B1<the weight of the rib 176B5.

As a result, in the illustration of FIGS. 4 and 5, the weight of the turn-back part 171X1 is different from the weight of the turn-back part 171X2. The weight of the turn-back part 171Y1 is different from the weight of the turn-back part 171Y2.

Furthermore, the weight of the turn-back part 171X2 is different from the weight of the turn-back part 171X3. The weight of the turn-back part 171Y2 is different from the weight of the turn-back part 171Y3.

Furthermore, the weight of the turn-back part 171X3 is different from the weight of the turn-back part 171X4. The weight of the turn-back part 171Y3 is different from the weight of the turn-back part 171Y4. Furthermore, the weight of the turn-back part 171X4 is different from the weight of the turn-back part 171X5. The weight of the turn-back part 171Y4 is different from the weight of the turn-back part 171Y5.

Furthermore, the weight of the turn-back part 171X1 is different from the weight of the turn-back part 171X3. The weight of the turn-back part 171Y1 is different from the weight of the turn-back part 171Y3.

Furthermore, the weight of the turn-back part 171X2 is equal to the weight of the turn-back part 171X4. The weight of the turn-back part 171Y2 is equal to the weight of the turn-back part 171Y4. On an as-needed basis, however, the weight of the turn-back part 171X2 may be different from the weight of the turn-back part 171X4, and the weight of the turn-back part 171Y2 may be different from the weight of the turn-back part 171Y4.

Furthermore, the weight of the turn-back part 171X3 is different from the weight of the turn-back part 171X5. The weight of the turn-back part 171Y3 is different from the weight of the turn-back part 171Y5.

As described above, however, turn-back parts each connecting adjacent vertical beams may be different in weight with respect to at least three adjacent vertical beams. Whether to cause turn-back parts each connecting adjacent vertical beams to be different in weight with respect to three or more adjacent vertical beams may be suitably determined by a simulation or experiment with respect to gain in normal modes of vibration. Furthermore, to what degree turn-back parts are caused to differ in weight may be suitably determined by a simulation or experiment with respect to gain in normal modes of vibration.

Figure 6:
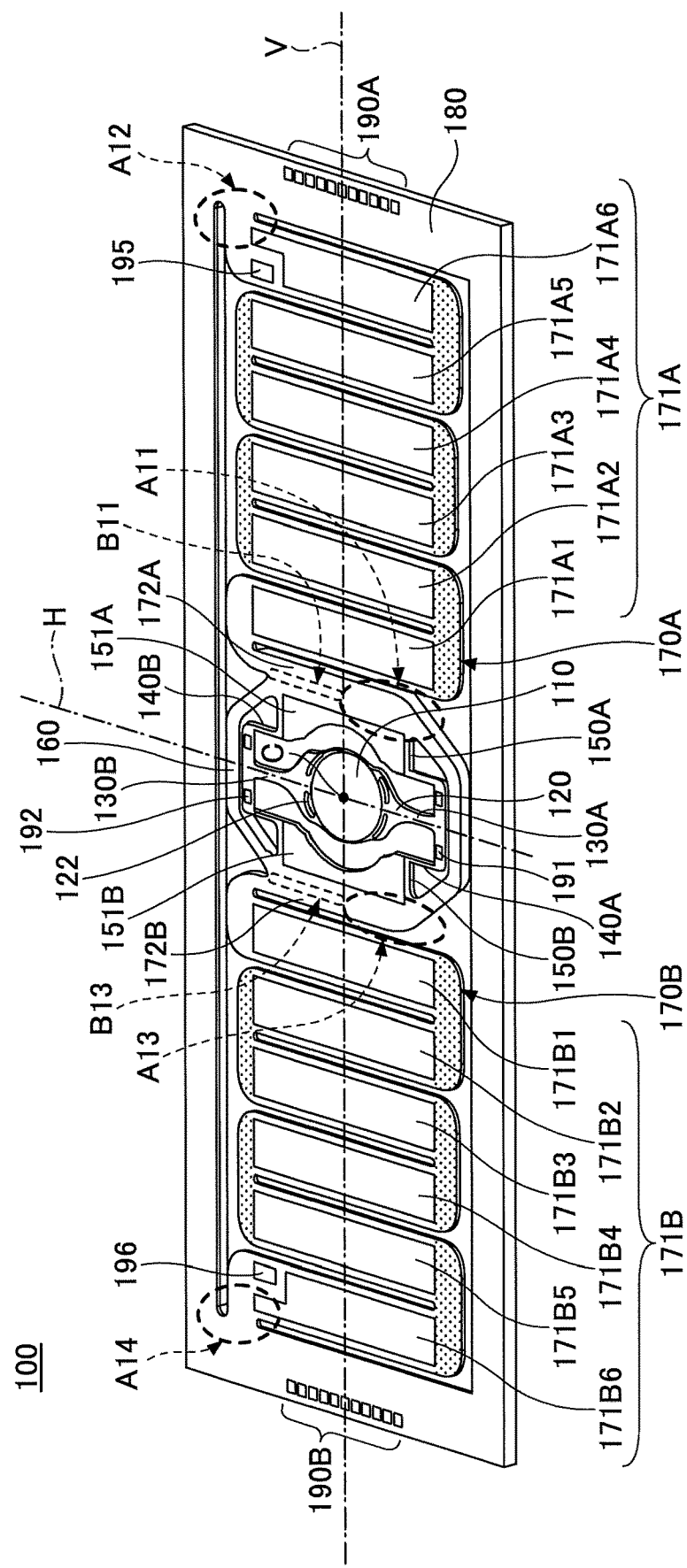
FIG. 6 is an upper-side perspective view of another configuration of the optical scanning part of the optical scanning device according to the first embodiment.
Figure 7:
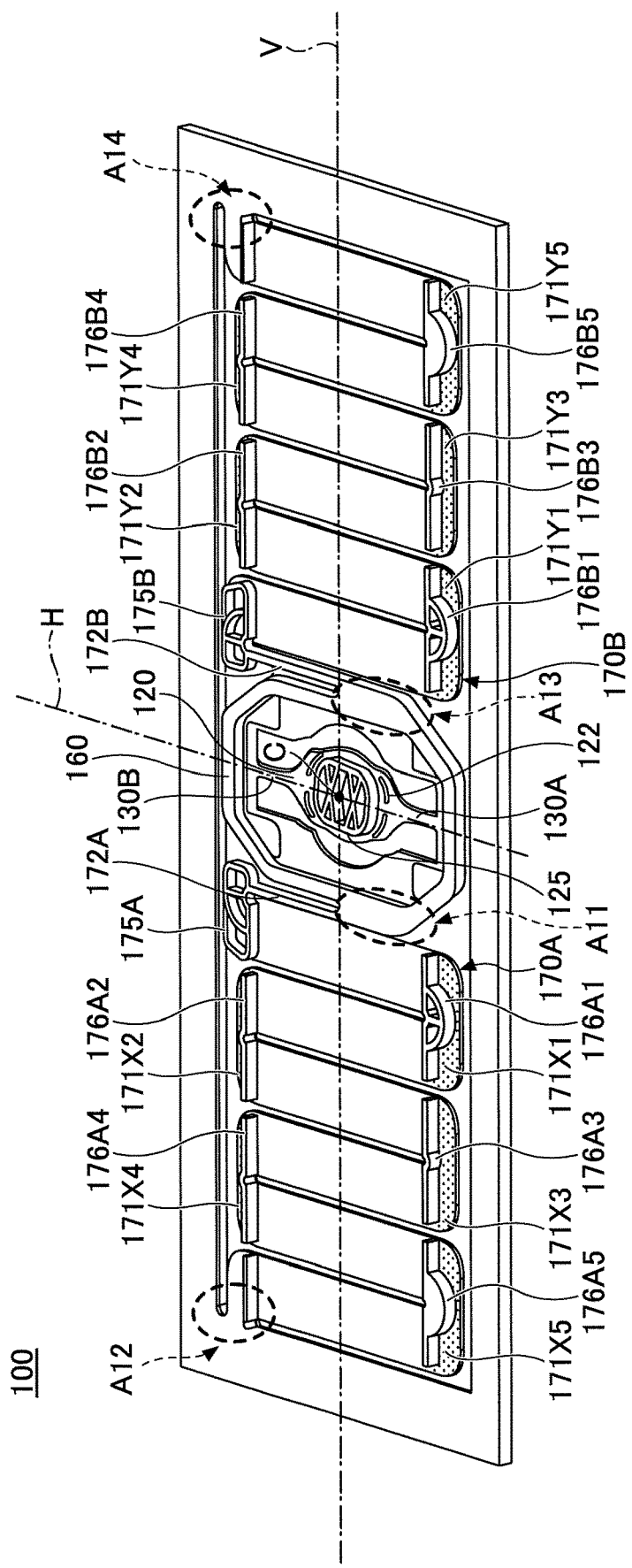
FIG. 7 is a lower-side perspective view of the other configuration of the optical scanning part of the optical scanning device according to the first embodiment.

FIGS. 6 and 7 are an upper-side perspective view and a lower-side perspective view, respectively, of another configuration of the optical scanning part of the optical scanning device according to the first embodiment.

The optical scanning part 100 may be formed, using, for example, a silicon on insulator (SOI) substrate including a support layer, a buried oxide (BOX) layer, and an active layer. In this case, as illustrated in FIGS. 6 and 7, the connecting beams 172A and 172B and the movable frame 160 may be connected by the active layer and the BOX layer. In FIG. 6, a dashed-line region B11 is where the connecting beam 172A and the movable frame 160 are connected by the active layer and the BOX layer, and a dashed-line region B13 is where the connecting beam 172B and the movable frame 160 are connected by the active layer and the BOX layer. The connecting beams 172A and 172B and the movable frame 160 may alternatively be connected by the active layer alone.

Figure 8:
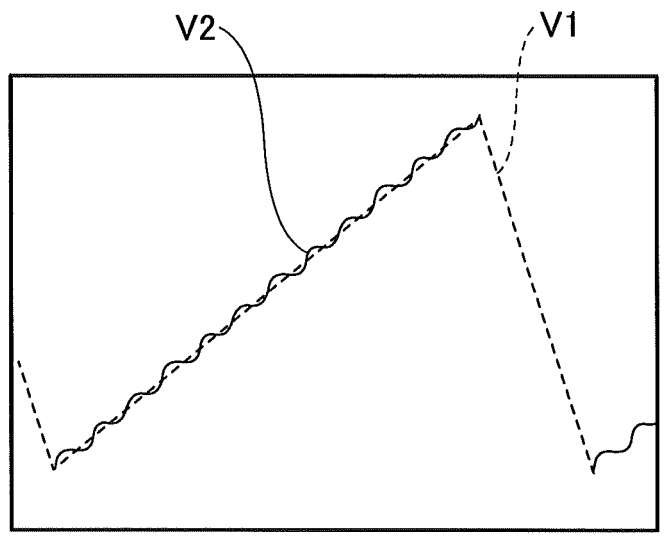
FIG. 8 is a graph illustrating the relationship between a voltage waveform applied to drive sources and the operation waveform of a mirror.
Figure 9:
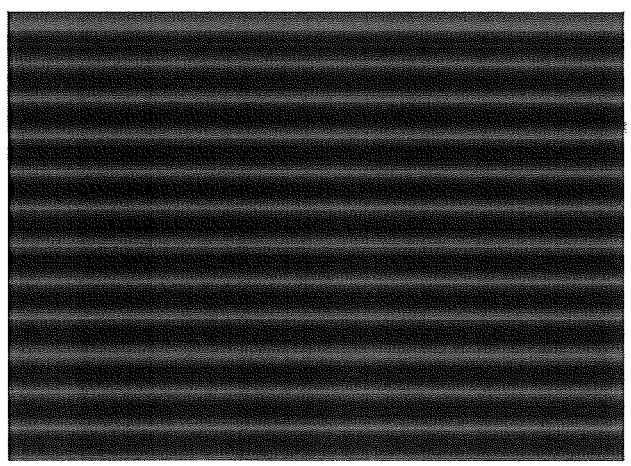
FIG. 9 illustrates a state of image display performed using the optical scanning device.

Next, an operation of the optical scanning device 1000 is described. FIG. 8 is a graph illustrating the relationship between a voltage waveform applied to the drive sources 171A and 171B and the operation waveform of the mirror 110. In FIG. 8, a dashed line represents a drive voltage waveform V1 and a solid line represents a mirror operation waveform V2. FIG. 9 illustrates a state of image display performed using the optical scanning device 1000.

For example, as illustrated in FIG. 8, a voltage of a sawtooth waveform is applied to the drive sources 171A and 171B. As a result, for example, compared with the case where a voltage of a sinusoidal waveform is applied, it is possible to lengthen a section where the rate at which light is caused to perform scanning by the mirror 110 is constant.

As illustrated in FIG. 8, when a sawtooth waveform is applied to the drive sources 171A and 171B as the drive voltage waveform V1 to drive the mirror 110, the mirror operation waveform V2 of the mirror 110 oscillates, that is, so-called ringing occurs. When ringing occurs, in the case of displaying an image using the optical scanning device 1000, horizontal streaks are generated as illustrated in FIG. 9, for example.

To control the occurrence of ringing, it is possible to use a filter such as a notch filter to remove a frequency component corresponding to a natural frequency that causes the occurrence of ringing or a harmonic component of the natural frequency.

If there are multiple normal modes of vibration to be removed, however, wide band filtering using multiple filters is required to remove frequency components corresponding to natural frequencies or harmonic components of natural frequencies. When wide band filtering is performed, the drive voltage waveform V1 (dashed line), which is a sawtooth waveform, becomes a waveform rounded with reduced linearity as a mirror operation waveform V3 (solid line) illustrated in FIG. 10.

Figure 10:
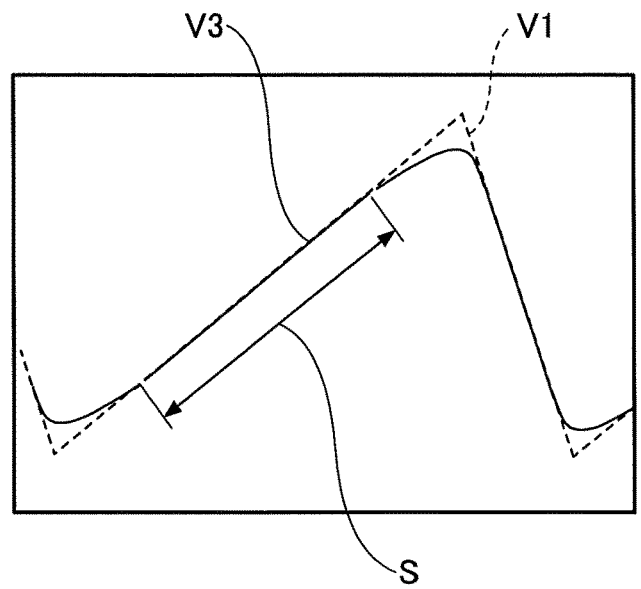
FIG. 10 illustrates the rounding of the mirror operation waveform.

As a result, a rectilinear section S of FIG. 10 to become a vertical drawing section (a section where the scanning rate of the optical scanning device is constant) is shortened, and therefore, a section available for displaying an image is reduced. Therefore, to control the occurrence of ringing while ensuring a section available for displaying an image, it is more effective to reduce the number of normal modes of vibrations to be removed than to perform wide band filtering.

Figure 11:
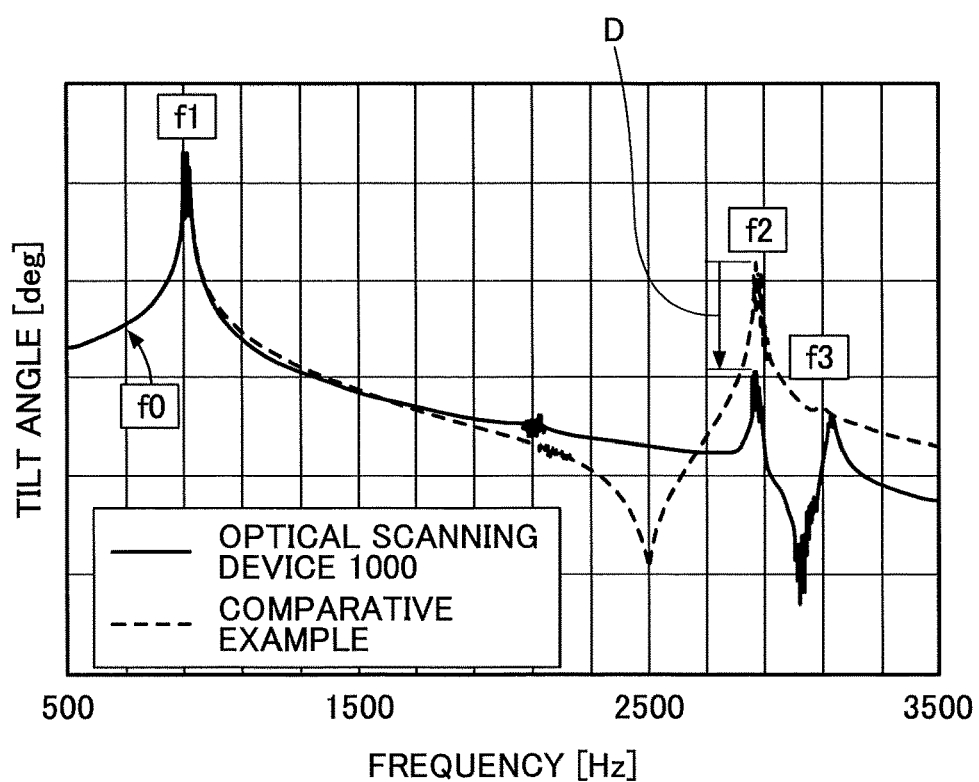
FIG. 11 is a graph illustrating frequency characteristics of an optical scanning device.

FIG. 11 is a graph illustrating frequency characteristics of an optical scanning device. In FIG. 11, the solid line represents frequency characteristics of the optical scanning device 1000, and the dashed line represents frequency characteristics of an optical scanning device according to a comparative example. Furthermore, in FIG. 11, the horizontal axis represents the frequency (Hz) of the drive voltage waveform V1, and the vertical axis represents the deflection angle (tilt) of the mirror 110. The optical scanning device according to the comparative example is a device that is different in that all turn-back parts have the same weight from, but otherwise is equal to, the optical scanning device 1000.

As illustrated in FIG. 11, according to the optical scanning device of the comparative example, the normal modes of vibration of the optical scanning part occur at frequencies f0 (around 700 Hz), f1 (around 900 Hz), f2 (around 2900 Hz), and f3 (around 3100 Hz). According to the optical scanning device 1000, the normal modes of vibration of the optical scanning part occur at frequencies f1 (around 900 Hz), f2 (around 2900 Hz), and f3 (around 3100 Hz) the same as in the comparative example, while the deflection angle gain at f2 (around 2900 Hz) is reduced to ⅒ or less as indicated by the arrow D.

This is believed to be because according to the optical scanning device 1000, turn-back parts each connecting adjacent vertical beams are different in weight with respect to at least three adjacent vertical beams, and therefore the vibration energy of the second drive beams 170A and 170B at the time of resonance is distributed to reduce the deflection angle gain at f2 (around 2900 Hz).

In FIG. 11, the peak at f0 (around 700 Hz) is extremely small. This is because mechanical measures are taken in the optical scanning device 1000 as follows. That is, according to the optical scanning device 1000, the movable frame connection part A11 is placed on the side substantially opposite to the side on which the fixed frame connection part A12 is placed relative to the vertical rotation axis V, and the movable frame connection part A13 is placed on the side substantially opposite to the side on which the fixed frame connection part A14 is placed relative to the vertical rotation axis V.

According to the optical scanning device 1000, reduction in the deflection angle gain at f2 (around 2900 Hz) makes it possible to mechanically control ringing without performing wide band filtering. That is, it is possible to prevent generation of visible horizontal streaks (alternate light and dark areas) as illustrated in FIG. 9 in a projected image without rounding the sawtooth drive voltage waveform V1 (dashed line) (while sufficiently ensuring the rectilinear section S of FIG. 10).

Figure 12B:
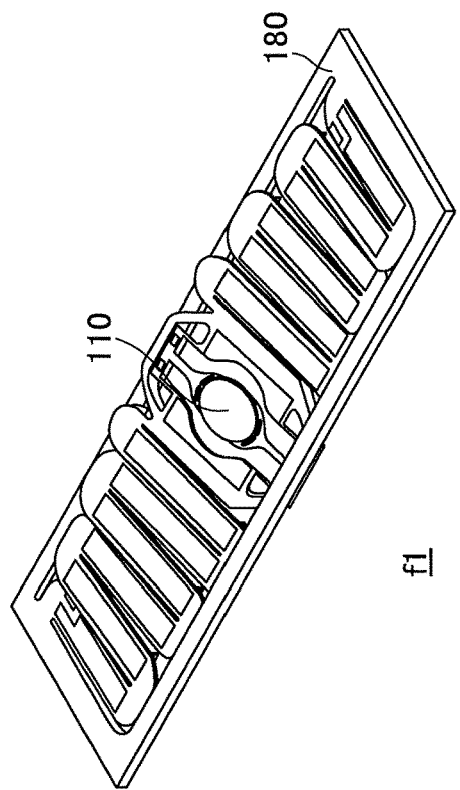
FIGS. 12A through 12D are diagrams illustrating normal modes of vibration.
Figure 12D:
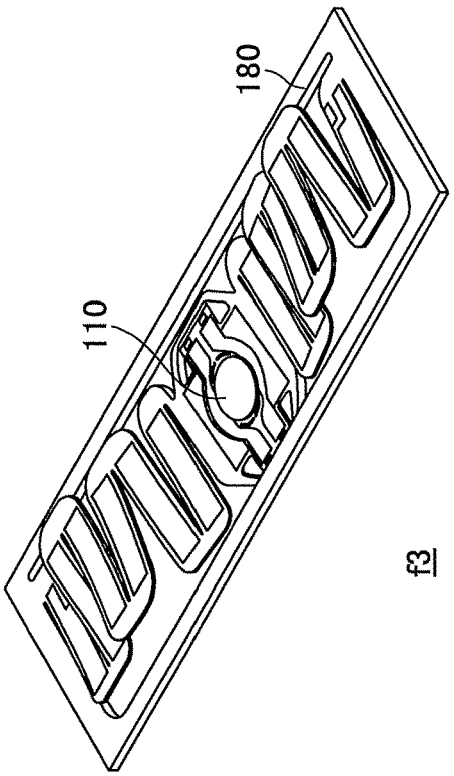
Figure 12A:
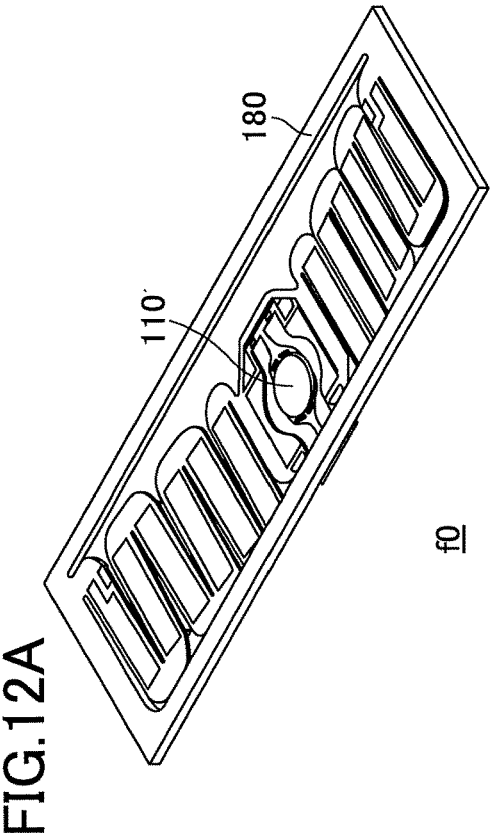
Figure 12C:
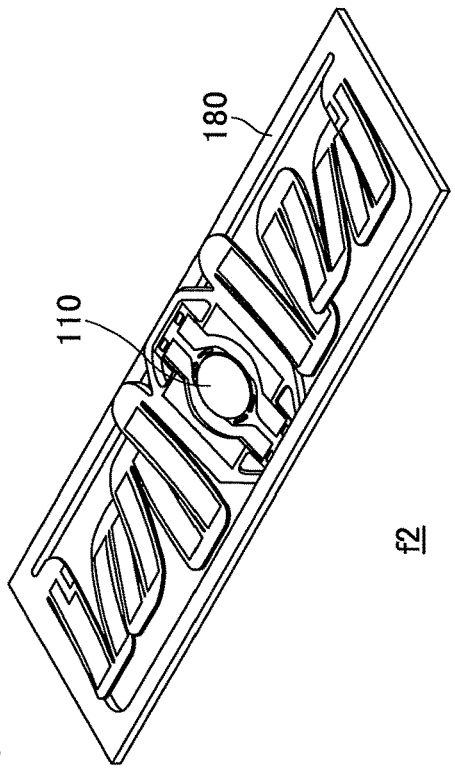

The normal modes of vibration of the optical scanning device 1000 are as illustrated in FIGS. 12A through 12D. FIGS. 12A, 12B, 12C and 12D illustrate f0, f1, f2 and f3, respectively. As illustrated in FIGS. 12A and 12D, at f0 and f3, the mirror 110 hardly tilts, and visible horizontal streaks due to ringing are not generated. As illustrated in FIGS. 12B and 12C, at f1 and f2, the mirror 110 tilts, and measures should be taken against ringing. The mirror 110 does not tilt at f0 because of the above-described mechanical measures. In other words, mechanical measures are already taken with respect to f0.

As described above, with respect to f2, ringing is addressed by causing turn-back parts each connecting adjacent vertical beams to be different in weight with respect to at least three adjacent vertical beams, while ringing should be addressed with respect to f1 as well. With respect to f1, because the number of normal modes of vibration to be removed is one, it is possible to perform control to prevent the occurrence of ringing by optimizing a drive waveform by inserting a notch filter into a drive signal. In this case, only frequencies around f1 may be reduced by the notch filter, and no wide band filtering is necessary. Therefore, it is possible to control the occurrence of ringing due to f1 without shortening the rectilinear section S of FIG. 10.

Thus, according to the optical scanning part 100, turn-back parts each connecting adjacent vertical beams are caused to be different in weight with respect to at least three adjacent vertical beams. This makes it possible to distribute the vibration energy of the second drive beams 170A and 170B at the time of resonance to reduce the deflection angle gain at f2 (around 2900 Hz).

As a result, the number of normal modes of vibration with respect to which ringing should be addressed by filtering can be reduced to only one (f1), and therefore, it is possible to remove frequency components corresponding to natural frequencies that cause the occurrence of ringing or harmonic components of the natural frequencies without performing wide band filtering. Therefore, a voltage of high linearity, that is, a voltage that is rectilinear over a long section during one cycle, can be applied to the drive sources 171A and 171B. As a result, it is possible to control the occurrence of ringing while ensuring a section available for displaying an image.

To reduce the deflection angle gain at f2, it is preferable to cause the turn-back parts 171X1 and 171X5 to be heavier than the turn-back parts 171X2, 171X3 and 171X4. Likewise, it is preferable to cause the turn-back parts 171Y1 and 171Y5 to be heavier than the turn-back parts 171Y2, 171Y3 and 171Y4.

To reduce the deflection angle gain at f2, it is preferable to cause the turn-back part 171X3 to be heavier than the turn-back parts 171X2 and 171X4 among the turn-back parts 171X2, 171X3 and 171X4. Likewise, it is preferable to cause the turn-back part 171Y3 to be heavier than the turn-back parts 171Y2 and 171Y4 among the turn-back parts 171Y2, 171Y3 and 171Y4.

According to the above-described weight relationship of the turn-back parts, a change in the deflection angle gain at f2 is less sensitive to a change in the weight of a turn-back part closer to the fixed frame 180 (more distant from the mirror 110) in the direction of the vertical rotation axis V, and is more sensitive to a change in the weight of a turn-back part closer to the movable frame 160 (closer to the mirror 110) in the direction of the vertical rotation axis V. Therefore, to reduce variations in characteristics due to shape variations in manufacture, a position closer to the fixed frame 180 is preferable for reducing the deflection angle gain at f2 in view of the lower sensitivity of a change in the deflection angle gain at f2.

For example, when the weight of the turn-back part 171X1 or 171X5 may be increased, it is preferable to increase the weight of the turn-back part 171X5. In the case of adjusting weight among the turn-back parts 171X2, 171X3 and 171X4, it is preferable to cause the turn-back part 171X3 to be heavier than the turn-back part 171X2, and to cause the turn-back part 171X4 to be heavier than the turn-back part 171X3. The same applies to the turn-back parts 171Y1 through 171Y5.

Specifically, the weight relationship of turn-back parts preferably includes 171X2<171X1, 171X4<171X5, 171X1≤171X5, 171Y2<171Y1, 171Y4<171Y5, and 171Y1≤171Y5, more preferably, further includes 171X3<171X1≤171X5 and 171Y3<171Y1≤171Y5, and still more preferably, further includes 171X2≤171X4 and 171Y2≤171Y4.

In particular, among the turn-back parts 171X1 through 171X5, it is preferable to cause all of the turn-back parts 171X1 through 171X5 to be different in weight with the turn-back part 171X5 being the heaviest. Likewise, among the turn-back parts 171Y1 through 171Y5, it is preferable to cause all of the turn-back parts 171Y1 through 171Y5 to be different in weight with the turn-back part 171Y5 being the heaviest.

Second Embodiment

Figure 13:
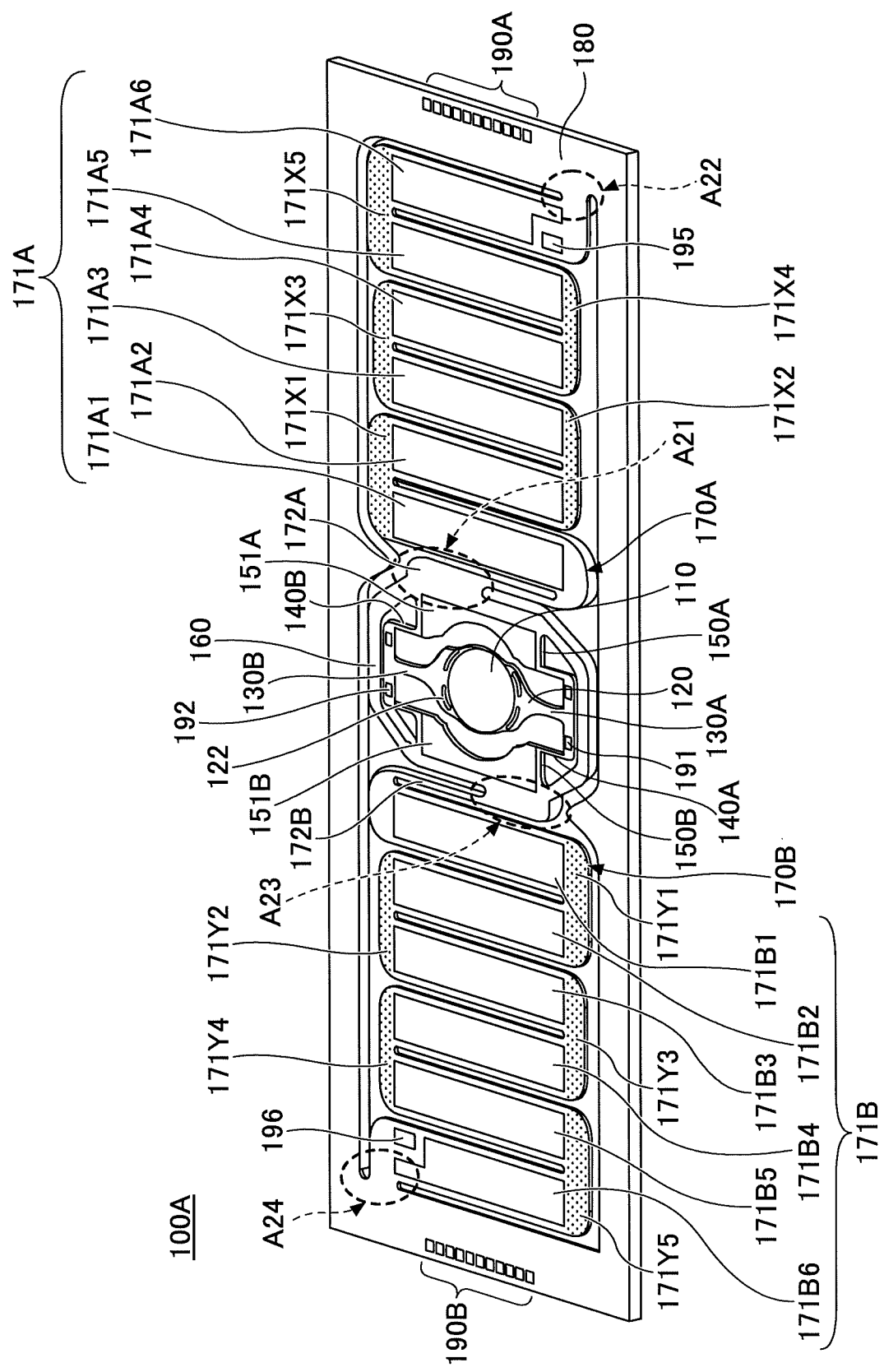
FIG. 13 is an upper-side perspective view of an optical scanning part of an optical scanning device according to a second embodiment.
Figure 14:
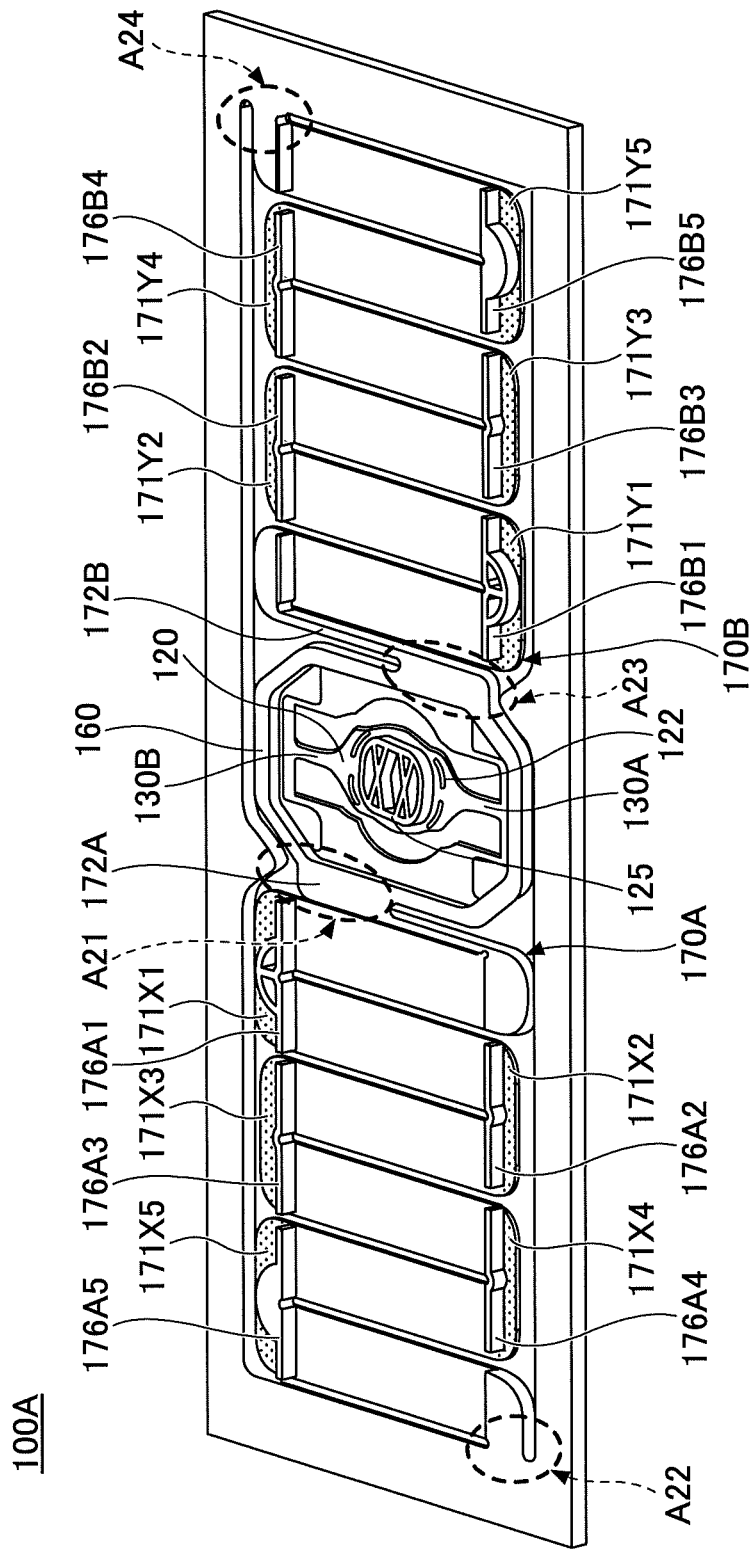
FIG. 14 is a lower-side perspective view of the optical scanning part of the optical scanning device according to the second embodiment.

An optical scanning device according to a second embodiment is described. FIGS. 13 and 14 are an upper-side perspective view and a lower-side perspective view, respectively, of an optical scanning part of an optical scanning device according to the second embodiment.

As illustrated in FIGS. 13 and 14, an optical scanning part 100A according to the second embodiment is different from the optical scanning part 100 according to the first embodiment in that the second drive beam 170A and the second drive beam 170B are point-symmetrically placed with respect to the center C of the light reflecting surface of the mirror 110 serving as a point of symmetry.

As a result, the turn-back parts 171X1 through 171X5 and the turn-back parts 171Y1 through 171Y5 as well are point-symmetrically placed with respect to the center C of the light reflecting surface of the mirror 110 serving as a point of symmetry. In addition, the ribs 176A1 through 176A5 and the ribs 176B1 through 176B5 as well are point-symmetrically placed with respect to the center C of the light reflecting surface of the mirror 110 serving as a point of symmetry. In other respects than those described above, the optical scanning part 100A may be the same as the optical scanning part 100 according to the first embodiment.

According to the optical scanning part 100A of the second embodiment, the same as in the first embodiment, a movable frame connection part A21 where the movable frame 160 and the second drive beam 170A are connected is placed on the side substantially opposite to the side on which a fixed frame connection part A22 where the fixed frame 180 and the second drive beam 170A are connected is placed relative to the vertical rotation axis V. Furthermore, a movable frame connection part A23 where the movable frame 160 and the second drive beam 170B are connected is placed on the side substantially opposite to the side on which a fixed frame connection part A24 where the fixed frame 180 and the second drive beam 170B are connected is placed relative to the vertical rotation axis V.

By causing turn-back parts each connecting adjacent vertical beams to be different in weight with respect to at least three adjacent vertical beams the same as in the optical scanning part 100, the optical scanning part 100A produces the same effects as the optical scanning part 100.

That is, the same as in the first embodiment, the number of normal modes of vibration with respect to which ringing should be addressed by filtering can be reduced to only one (f1), and therefore, it is possible to remove frequency components corresponding to natural frequencies that cause the occurrence of ringing or harmonic components of the natural frequencies without performing wide band filtering. Therefore, a voltage of high linearity, that is, a voltage that is rectilinear over a long section during one cycle, can be applied to the drive sources 171A and 171B. As a result, it is possible to control the occurrence of ringing while ensuring a section available for displaying an image.

Third Embodiment

Figure 15:
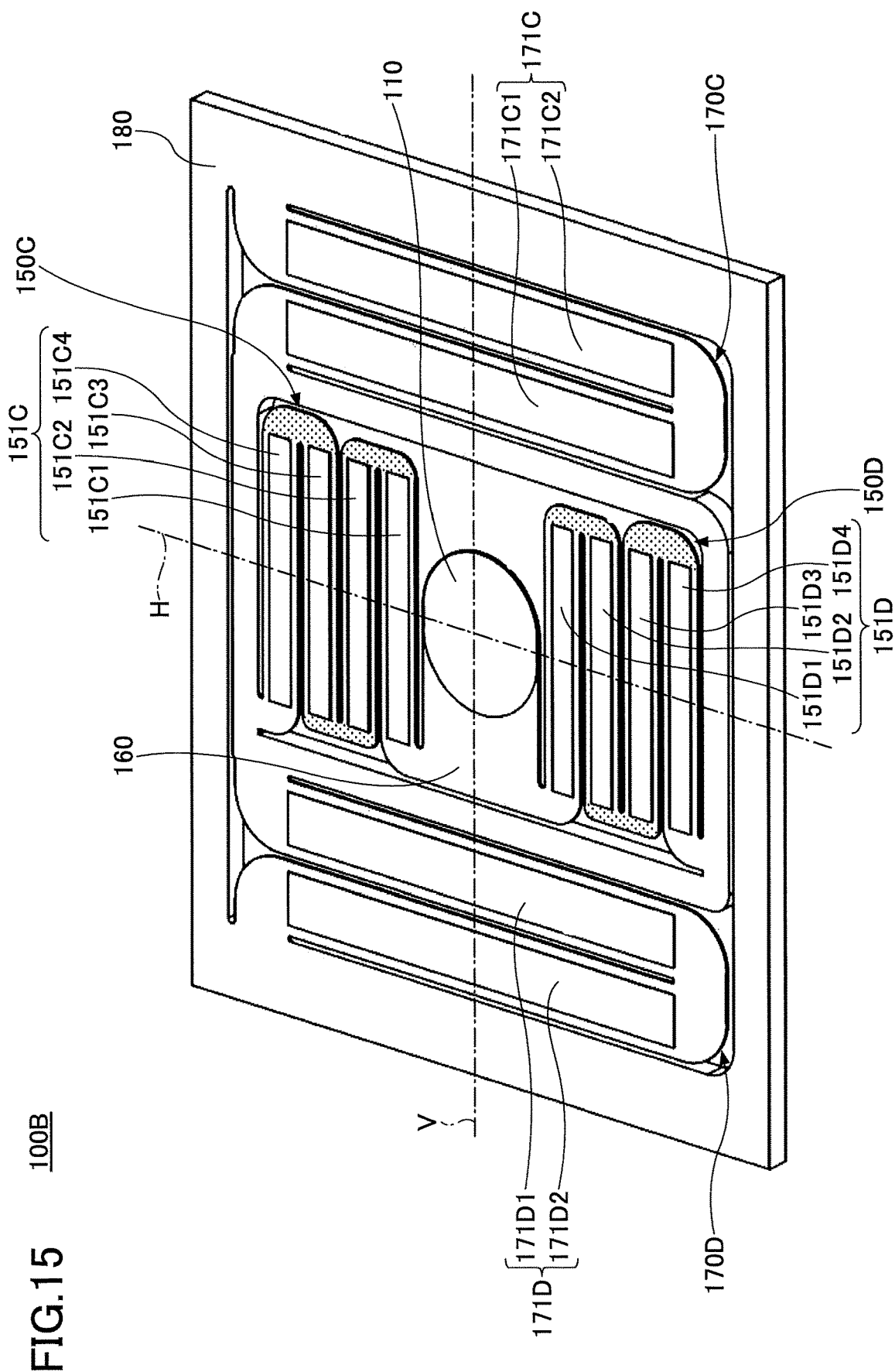
FIG. 15 is an upper-side perspective view of an optical scanning part of an optical scanning device according to a third embodiment.
Figure 16:
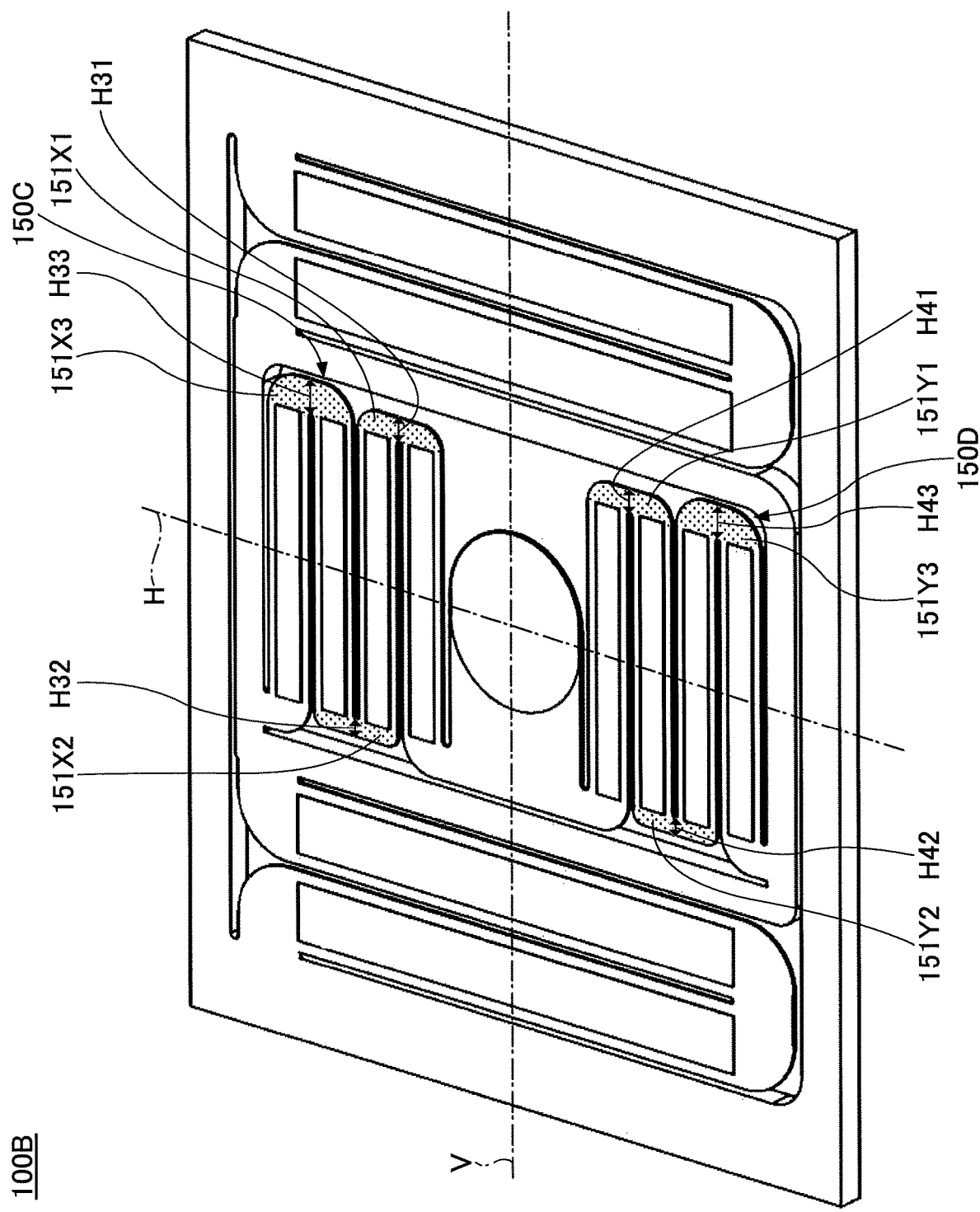
FIG. 16 is a diagram illustrating the height of a turn-back part.

An optical scanning device according to a third embodiment is described. FIG. 15 is an upper-side perspective view of an optical scanning part of an optical scanning device according to the third embodiment. FIG. 16 is a diagram illustrating the height of turn-back parts. A description of part of the third embodiment that is also shared by the first and second embodiments may be omitted.

According to the first embodiment, resonant oscillations by the first drive beams 150A and 150B are employed for horizontal driving. In an optical scanning part 100B according to the third embodiment illustrated in FIGS. 15 and 16, first drive beams 150C and 150D are provided in place of the first drive beams 150A and 150B of the optical scanning part 100. Non-resonant oscillations are employed for horizontal driving by the first drive beams 150A and 150B.

Drive sources 151C and 151D are formed on the upper surfaces of the first drive beams 150C and 150D, respectively, one on each vertical beam that is a rectangular unit without a curving portion. Each of the drive sources 151C includes a piezoelectric thin film, an upper electrode formed on the upper surface of the piezoelectric thin film, and a lower electrode formed on the lower surface of the piezoelectric thin film. Each of the drive sources 151D includes a piezoelectric thin film, an upper electrode formed on the upper surface of the piezoelectric thin film, and a lower electrode formed on the lower surface of the piezoelectric thin film.

The drive sources 151C include drive sources 151C1, 151C2, 151C3 and 151C4 that are arranged upward along the horizontal rotation axis H from the mirror 110. Likewise, the drive sources 151D include drive sources 151D1, 151D2, 151D3 and 151D4 that are arranged downward along the horizontal rotation axis H from the mirror 110. In this case, horizontal oscillations can be performed by driving the drive sources 151C1, 151D1, 151C3 and 151D3 with the same first waveform and driving the drive sources 151C2, 151D2, 151C4 and 151D4 with the same second waveform different in phase from the first waveform.

In the optical scanning part 100B, second drive beams 170C and 170D are provided in place of the second drive beams 170A and 170B of the optical scanning part 100. The same as in the first embodiment, non-resonant oscillations are employed for vertical driving by the second drive beams 170C and 170D.

Drive sources 171C and 171D are formed on the upper surfaces of the second drive beams 170C and 170D, respectively, one on each vertical beam that is a rectangular unit without a curving portion. Each of the drive sources 171C includes a piezoelectric thin film, an upper electrode formed on the upper surface of the piezoelectric thin film, and a lower electrode formed on the lower surface of the piezoelectric thin film. Each of the drive sources 171D includes a piezoelectric thin film, an upper electrode formed on the upper surface of the piezoelectric thin film, and a lower electrode formed on the lower surface of the piezoelectric thin film.

The drive sources 171C include drive sources 171C1 and 171C2 that are arranged rightward along the vertical rotation axis V from the mirror 110. Likewise, the drive sources 171D include drive sources 171D1 and 171D2 that are arranged leftward along the vertical rotation axis V from the mirror 110. In this case, vertical oscillations can be performed by driving the drive sources 171C1 and 171D1 with the same first waveform and driving the drive sources 171C2 and 171D2 with the same second waveform different in phase from the first waveform.

As illustrated in FIGS. 15 and 16, the first drive beam 150C includes turn-back parts each connecting ends of adjacent horizontal beams extending in a direction parallel to the vertical rotation axis V, and as a whole, has a zigzag shape.

For example, in the first drive beam 150C, the first horizontal beam and the second horizontal beam from the mirror 110 have respective ends connected by a turn-back part 151X1. The second horizontal beam and the third horizontal beam have respective ends connected by a turn-back part 151X2. The third horizontal beam and the fourth horizontal beam have respective ends connected by a turn-back part 151X3. In FIGS. 15 and 16, the turn-back parts are indicated by a dotted pattern for clarity.

Likewise, the first drive beam 150D includes turn-back parts each connecting ends of adjacent horizontal beams extending in a direction parallel to the vertical rotation axis V, and as a whole, has a zigzag shape.

For example, in the first drive beam 150D, the first horizontal beam and the second horizontal beam from the mirror 110 have respective ends connected by a turn-back part 151Y1. The second horizontal beam and the third horizontal beam have respective ends connected by a turn-back part 151Y2. The third horizontal beam and the fourth horizontal beam have respective ends connected by a turn-back part 151Y3.

The turn-back parts 151X1, 151X2 and 151X3 have heights H31, H32 and H33, respectively. The turn-back parts 151Y1, 151Y2 and 151Y3 have heights H41, H42 and H43, respectively. In FIG. 16, the height of the turn-back part is a maximum length in a direction parallel to the vertical rotation axis V (a direction perpendicular to the horizontal rotation axis H).

A rib such as the rib 176A1 may be provided on the lower surfaces of the turn-back parts 151X1, 151X2 and 151X3 and the lower surfaces of the turn-back parts 151Y1, 151Y2 and 151Y3. The weight of the rib provided on the lower surface of each turn-back part may be suitably adjusted.

The same as in the first embodiment, the optical scanning part 100B is so designed that with respect to three adjacent vertical beams (a first beam, a second beam, and a third beam) placed on each side of the mirror 110, a turn-back part connecting the first beam and the second beam is different in weight from a turn-back part connecting the second beam and the third beam. Turn-back parts each connecting adjacent vertical beams may be different in weight with respect to four or more adjacent vertical beams.

For example, with the turn-back part 151X3 being the heaviest, the turn-back part 151X1 may be heavier than the turn-back part 151X2, the turn-back part 151X3 may be heavier than the turn-back part 151X2, and the turn-back part 151X3 may be heavier than the turn-back part 151X1. The same applies to the turn-back parts 151Y1 through 151Y3.

To change the weights of the turn-back parts, the heights (H31, H32, H33, H41, H42 and H43) of the turn-back parts may be changed, the weights of the ribs on the lower surfaces of the turn-back parts may be changed, or both may be changed.

Thus, in the optical scanning part 100B, the same as in the optical scanning part 100, turn-back parts each connecting adjacent horizontal beams is caused to be different in weight with respect to at least three adjacent horizontal beams. This makes it possible to distribute the vibration energy of the first drive beams 150C and 150D at the time of resonance to reduce deflection angle gain.

As a result, it is possible to remove frequency components corresponding to natural frequencies that cause the occurrence of ringing or harmonic components of the natural frequencies without performing wide band filtering. Therefore, a voltage of high linearity, that is, a voltage that is rectilinear over a long section during one cycle, can be applied to the drive sources 151O and 151D. As a result, it is possible to control the occurrence of ringing while ensuring a section available for displaying an image.

In the illustration of FIGS. 15 and 16, four horizontal beams along the vertical rotation axis V are provided on each side and two vertical beams along the horizontal rotation axis H are provided on each side as a non-limiting example. In particular, in the case of providing three or more vertical beams along the horizontal rotation axis H on each side, turn-back parts on the vertical beam side may be caused to differ the same as in the first embodiment.

Preferred embodiments are described above. The present invention, however, is not limited to the above-described embodiments, and variations and replacements may be added to the above-described embodiments without departing from the scope of the present invention.

What is claimed is:

1. An optical scanning device comprising:
a fixed frame;
a mirror provided within the fixed frame and including a light reflecting surface on an upper side of the optical scanning device;
a first drive beam and a second drive beam provided on a right side and a left side, respectively, of the mirror and configured to support the mirror within the fixed frame; and
a drive source provided on the first drive beam and the second drive beam, the drive source being configured to oscillate the mirror about a predetermined axis passing through a center of the light reflecting surface,
wherein each of the first drive beam and the second drive beam includes a plurality of beams each extending in a direction perpendicular to the predetermined axis and one or more turn-back parts each connecting ends of adjacent beams among the plurality of beams, each of the first drive beam and the second drive beam having a zigzag shape as a whole, and
wherein the plurality of beams include a first beam, a second beam adjacent to the first beam, a third beam adjacent to the second beam, and a fourth beam adjacent to the third beam,
the one or more turn-back parts include a first turn-back part connecting the first and second beams, a second turn-back part connecting the second and third beams, and a third turn-back part connecting the third and fourth beams,
the first turn-back part and the second turn-back part have different weights by having different heights, the heights being respective maximum lengths of the first and second turn-back parts in the direction perpendicular to the predetermined axis,
the third turn-back part has a weight different from the weight of the first turn-back part by having a height different from the height of the first turn-back part, the height of the third turn-back part being a maximum length of the third turn-back part in the direction perpendicular to the predetermined axis, and
the first turn-back part and the third turn-back part face a same inner side of the fixed frame, and a distance between the first turn-back part and the inner side of the fixed frame is different from a distance between the third turn-back part and the inner side of the fixed frame.

2. The optical scanning device as claimed in claim 1, further comprising:
a movable frame supporting the mirror,
wherein the plurality of beams of the first and second drive beams support the movable frame from a first side and a second side, respectively, of the movable frame, the second side being opposite to the first side,
wherein the fourth beam of the first drive beam and the fourth beam of the second drive beam being provided on the first side and the second side, respectively, of the movable frame, and wherein in each of the first and second drive beams,
the third turn-back part has the weight different from the weight of the second turn-back part by having the height different from the height of the second turn-back part.

3. The optical scanning device as claimed in claim 2, wherein the plurality of beams of each of the first and second drive beams include a fifth beam adjacent to the fourth beam, the fifth beam of the first drive beam and the fifth beam of the second drive beam being provided on the first side and the second side, respectively, of the movable frame, and
wherein in each of the first and second drive beams,
the one or more turn-back parts include a fourth turn-back part connecting the fourth and fifth beams, and
a weight of the fourth turn-back part is different from the weight of the third turn-back part.

4. The optical scanning device as claimed in claim 3, wherein the plurality of beams of each of the first and second drive beams include a sixth beam adjacent to the fifth beam, the sixth beam of the first drive beam and the sixth beam of the second drive beam being provided on the first side and the second side, respectively, of the movable frame, and
wherein in each of the first and second drive beams,
the one or more turn-back parts include a fifth turn-back part connecting the fifth and sixth beams, and
a weight of the fifth turn-back part is different from the weight of the fourth turn-back part.

5. The optical scanning device as claimed in claim 4, wherein in each of the first and second drive beams, the weight of the fifth turn-back part is different from the weight of the third turn-back part.

6. The optical scanning device as claimed in claim 4, wherein in each of the first and second drive beams,
the weight of the first turn-back part is more than the weight of the second turn-back part,
the weight of the fifth turn-back part is more than the weight of the fourth turn-back part, and
the weight of the fifth turn-back part is more than or equal to the weight of the first turn-back part.

7. The optical scanning device as claimed in claim 6, wherein in each of the first and second drive beams, the weight of the first turn-back part is more than the weight of the third turn-back part.

8. The optical scanning device as claimed in claim 6, wherein in each of the first and second drive beams, the weight of the fourth turn-back part is more than or equal to the weight of the second turn-back part.

9. The optical scanning device as claimed in claim 1, wherein the first drive beam and the second drive beam are axisymmetrically placed with respect to a straight line as an axis of symmetry, the straight line passing through the center of the light reflecting surface and perpendicular to the predetermined axis.

10. The optical scanning device as claimed in claim 1, wherein the first drive beam and the second drive beam are point-symmetrically placed with respect to the center of the light reflecting surface serving as a point of symmetry.

11. The optical scanning device as claimed in claim 1, wherein the first beam is closer to the mirror than are the second and third beams.

12. An optical scanning device comprising:
a fixed frame;
a mirror provided within the fixed frame and including a light reflecting surface on an upper side of the optical scanning device;
a movable frame supporting the mirror within the fixed frame;
a first drive beam and a second drive beam provided on a right side and a left side, respectively, of the movable frame to support the movable frame within the fixed frame;
a first connection part connecting the movable frame and the first drive beam;
a second connection part connecting the movable frame and the second drive beam; and
a drive source provided on the first drive beam and the second drive beam, the drive source being configured to oscillate the mirror about a predetermined axis passing through a center of the light reflecting surface,
wherein each of the first drive beam and the second drive beam includes a plurality of beams each having a width in a first direction along the predetermined axis and a length in a second direction perpendicular to the predetermined axis, and one or more turn-back parts each connecting ends of adjacent beams among the plurality of beams, each of the first drive beam and the second drive beam having a zigzag shape as a whole, and
wherein the plurality of beams include a first beam, a second beam adjacent to the first beam, and a third beam adjacent to the second beam,
the one or more turn-back parts include a first turn-back part connecting the first and second beams and a second turn-back part connecting the second and third beams, and
the first turn-back part and the second turn-back part have different weights by including respective ribs that are different in weight, the ribs being on a lower side of the optical scanning device opposite to the upper side, the ribs each including a first portion elongated in the first direction and a second portion extending from the first portion in the second direction to protrude away from a space in which the plurality of beams are provided, the ribs having different weights by including the respective second portions that are different in shape.

13. An optical scanning device comprising:
a fixed frame;
a mirror provided within the fixed frame and including a light reflecting surface on an upper side of the optical scanning device;
a movable frame supporting the mirror within the fixed frame;
a first drive beam and a second drive beam provided on a right side and a left side, respectively, of the movable frame to support the movable frame within the fixed frame;
a first connection part connecting the movable frame and the first drive beam;
a second connection part connecting the movable frame and the second drive beam; and
a drive source provided on the first drive beam and the second drive beam, the drive source being configured to oscillate the mirror about a predetermined axis passing through a center of the light reflecting surface,
wherein each of the first drive beam and the second drive beam includes a plurality of beams each having a width in a first direction along the predetermined axis and a length in a second direction perpendicular to the predetermined axis, and one or more turn-back parts each connecting ends of adjacent beams among the plurality of beams, each of the first drive beam and the second drive beam having a zigzag shape as a whole, and wherein the plurality of beams include a first beam, a second beam adjacent to the first beam, and a third beam adjacent to the second beam, the first beam being directly connected to the first or second connection part or the fixed frame, the one or more turn-back parts include a first turn-back part connecting the first and second beams and a second turn-back part connecting the second and third beams, and the first turn-back part and the second turn-back part have different weights by including a first rib and a second rib, respectively, that are different in weight, the ribs being on a lower side of the optical scanning device opposite to the upper side, the first rib being heavier than the second rib.

* * * * *